United States Patent
Yiu

(10) Patent No.: US 7,228,929 B2
(45) Date of Patent: Jun. 12, 2007

(54) VEHICLE BODY STIFFENER

(75) Inventor: Arnold T. J. Yiu, Richmond Hill (CA)

(73) Assignee: Intier Automotive Closures Inc., Newmarket, Ontario (CA)

( * ) Notice: Subject to any disclaimer, the term of this patent is extended or adjusted under 35 U.S.C. 154(b) by 94 days.

(21) Appl. No.: 11/065,111

(22) Filed: Feb. 23, 2005

(65) Prior Publication Data

US 2005/0184560 A1     Aug. 25, 2005

Related U.S. Application Data

(60) Provisional application No. 60/546,881, filed on Feb. 23, 2004.

(51) Int. Cl.
*B62D 25/10* (2006.01)

(52) U.S. Cl. .............................. 180/69.21; 296/193.11

(58) Field of Classification Search ................ 296/204, 296/193.11, 191, 202; 180/69.2, 69.21; 16/85, 16/86
See application file for complete search history.

(56) References Cited

U.S. PATENT DOCUMENTS

| | | | |
|---|---|---|---|
| 3,633,390 A * | 1/1972 | Wartian ........................ 70/240 |
| 3,909,058 A | 9/1975 | Kramer et al. | |
| 4,012,807 A | 3/1977 | Kern | |
| 4,186,476 A * | 2/1980 | Mair et al. .................. 29/407.1 |
| 4,451,077 A | 5/1984 | Bruhnke et al. | |
| 5,115,878 A | 5/1992 | Hayata | |
| 5,605,371 A * | 2/1997 | Borchelt et al. ........ 296/187.09 |
| 5,806,917 A | 9/1998 | Townsend | |
| 5,826,672 A * | 10/1998 | Holter et al. ............. 180/69.21 |
| 5,833,024 A | 11/1998 | Kaneko | |
| 6,394,211 B1 * | 5/2002 | Palenchar et al. ........ 180/69.21 |
| 6,547,316 B2 * | 4/2003 | Chung .................... 296/187.03 |
| 6,637,531 B2 * | 10/2003 | Palenchar et al. ........ 180/69.21 |
| 6,868,930 B2 * | 3/2005 | Brogly et al. ............ 180/69.21 |
| 2003/0168878 A1 * | 9/2003 | Myers .................... 296/100.02 |
| 2005/0161979 A1 * | 7/2005 | Chernoff et al. ............. 296/191 |

OTHER PUBLICATIONS

Hood Pin Kits from the J.C. Whitney & Company Auto Parts & Accessories Book—Catalog No. 474J, p. 128, (c) Sep. 1986.*

* cited by examiner

*Primary Examiner*—Dennis H. Pedder
*Assistant Examiner*—Melissa Black
(74) *Attorney, Agent, or Firm*—Clark Hill PLC

(57) ABSTRACT

A vehicle body stiffener comprises an assembly of an outer member and an inner stiffener member which are joined to form a closure for the body. The inner stiffener member is formed to carry tension, compressive and torsional loads from the vehicle body and two locating pins at the corners of one side of the assembly and two latch pins at the corners of the opposite side of the assembly engage complementary receptacles on the vehicle body to make the assembly act as a structural member of the body to transfer forces from the body to the assembly. The assembly is preferably pivotally connected to the vehicle body by a pair of hinges which allow the assembly to be opened to gain access to the vehicle body interior. The assembly can be an engine compartment hood, a trunk lid or other closure.

19 Claims, 4 Drawing Sheets

VEHICLE BODY STIFFENER

CROSS-REFERENCE TO RELATED APPLICATION

This application claims priority to and all the benefits of U.S. Provisional Application No. 60/546,881, filed on Feb. 23, 2004.

BACKGROUND OF THE INVENTION

1. Field of the Invention

The present invention relates to a stiffener for a vehicle body and to a vehicle body including such a stiffener. More specifically, the present invention relates to a closure member for a vehicle body which also serves to stiffen the vehicle body when the closure is in the closed position and to the vehicle body including such a closure member.

2. Description of the Related Art

Much development work has occurred in the area of vehicle bodies, and in particular automobile bodies, in the last twenty years. Development work has been performed to lighten and strengthen vehicle bodies and to improve the passenger safety provided by those bodies. At the same time, it has been desired to reduce the manufacturing costs of the vehicle bodies.

Modern vehicle bodies often exhibit improved strength compared to vehicle bodies of even ten years ago, despite the fact that the amount of material used in the body has decreased. In particular, body stiffness has increased providing improved handling of the vehicle and a reduction in body flex.

However, the front end of the vehicle body remains an area in which it is difficult for designers to achieve desired body stiffness. The need to provide access to the engine compartment for servicing and repair of the engine and the presence of suspension and/or steering mechanisms provide significant limitations within which the body designers must work.

Typically, the engine compartment on a front-engine vehicle body is box-like in design having a frame or sub frame to which the engine is mounted, a firewall/cowl extending across the back of the engine compartment, a pair of fender/side walls extending forwardly from the firewall on either side of the engine and a fascia extending between the fender/sidewalls across the front of the vehicle.

A hood, typically hinged at the firewall and latched at the fascia, is provided to enclose the top of the engine compartment and to provide the desired aerodynamic and aesthetic features to the vehicle body while allowing access to the engine compartment. The limitations on the design of the typical engine compartment (it essentially a five-sided box,) often result in vehicle bodies that are still subject, to an undesired degree, to torsional deformation and/or body flex at the engine compartment.

One prior art technique used to reduce body flex and/or to add torsional rigidity through the engine compartment has been to add bolt-on cross members in the engine compartment. For example, it is known with NASCAR and other high performance automobiles to attach bolt-on cross braces in an X-pattern, each brace extending between one side of the firewall to the opposite side of the facia and being located over the engine to stiffen the engine compartment. These braces are typically bolted on so that they can be removed, as needed, to permit engine servicing.

While such bolt-on braces can significantly improve vehicle body stiffness, they suffer from disadvantages in that they increase the difficulty in performing engine servicing (as they must be removed from the engine compartment when access is required to the engine for certain service tasks), they occupy valuable space within the engine compartment that could be used to locate other devices, they can increase the overall weight of the vehicle and they can increase the cost of manufacturing and assembling the vehicle.

Similar problems can exist, although usually to a lesser extent, with the cargo area of vehicles, such as the trunk of a passenger vehicle.

SUMMARY OF THE INVENTION

In general, the invention employs a deck lid such as an engine hood or trunk lid as a stressed member to stiffen the body of the vehicle.

According to a first aspect of the present invention, there is provided a motor vehicle, comprising: a vehicle body, including an engine compartment; a hood pivotally attached to the body and moveable between an open position to provide access to the engine compartment and a closed position wherein the vehicle can be operated; and at least four structural connectors located generally near the corners of the hood and engaging corresponding positions of the engine compartment, when the hood is in the closed position, to stiffen the vehicle body by employing the hood as a stressed member.

According to another aspect of the present invention, there is provided a motor vehicle, comprising: a vehicle body, including an engine compartment having front, rear and two side sections; a hood pivotally attached to the vehicle body in order to provide access to the engine compartment, the hood including a stiffening member to carry compression, tension and torsion loads from between said side sections; and structural connectors acting between at least the corners of the stiffening member and the vehicle body when the hood is in a closed position in order to transfer forces via the stiffener member between said side sections.

According to yet another aspect of the present invention, there is provided a vehicle body stiffener comprising: an outer sheet member; an inner stiffener member including a perimeter frame, by which the inner stiffener member is attached to the outer sheet member, and a pair of cross braces extending between opposite corners of the perimeter frame in a generally cruciform manner; a pair of hinges connected to the inner stiffener member between a pair of adjacent corners of the inner stiffener member, the pair of hinges also being attached to the vehicle body to allow the stiffener to be moved between opened and closed positions; a pair of locating pins connected to the inner stiffener member adjacent the pair of hinges, the locating pins being operable to engage complementary locating pin receptacles on the vehicle body when the stiffener is in the closed position; and a pair of latch pins connected to the inner stiffener member between the pair of adjacent corners of the inner stiffener member opposite the side to which the pair of hinges is attached, the latch pins being operable to engage complementary latch receptacles on the vehicle body to maintain the assembly in a closed position until the latch receptacles are released, the latch pins and locating pins transferring compressive and/or tension forces from the vehicle body to the inner structural member to stiffen the vehicle body.

Preferably, the outer sheet member and the inner stiffener member are formed by stamping. Also preferably, the outer sheet member is joined to the inner stiffener member by hemming. Preferably, the body stiffener is an engine compartment hood or a cargo area closure such as a trunk lid.

According to yet another aspect of the present invention, there is provided a vehicle body for an automotive vehicle including an engine compartment, the vehicle body including a closure for the engine compartment comprising: an outer sheet member; an inner stiffener member including a perimeter frame by which the inner stiffener member is attached to the outer sheet member and a pair of cross braces extending between opposite corners of the perimeter frame in a generally cruciform manner; a pair of hinges connected to the inner stiffener member between a pair of adjacent corners of the inner stiffener member, the pair of hinges also being attached to the vehicle body to allow the stiffener to be moved between opened and closed positions; a pair of locating pins connected to the inner stiffener member adjacent the pair of hinges, the locating pins being operable to engage complementary locating pin receptacles on the vehicle body when the stiffener is in the closed position; and a pair of latch pins connected to the inner stiffener member between the pair of adjacent corners of the inner stiffener member opposite the side to which the pair of hinges is attached, the latch pins being operable to engage complementary latch receptacles on the vehicle body to maintain the assembly in a closed position until the latch receptacles are released, the latch pins and locating pins transferring compressive and/or tension forces from the vehicle body to the inner structural member.

The present invention provides a vehicle body stiffener comprising an assembly of an outer member and an inner stiffener member which are joined to form a closure for the vehicle body. The inner stiffener member is formed to carry compressive and tensions loads from the vehicle body and two locating pins at the corners of one side of the assembly and two latch pins at the corners of the opposite side of the assembly engage complementary receptacles on the vehicle body to make the assembly act as a structural member of the body to transfer forces from the body to the assembly. The assembly is preferably pivotally connected to the vehicle body by a pair of hinges which allow the assembly to be opened to gain access to the vehicle body interior. The assembly can be an engine compartment hood, a trunk lid or other closure.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Conventional hoods for modern automobiles typically comprise an outer sheet metal layer which provides the desired aerodynamic and aesthetic features to the vehicle and an inner frame member which is affixed to the outer sheet metal layer to provide attachment points for the hinges and the latch and to provide some resistance to deformation of the hood during normal use. Typically, the outer sheet metal layer is stamped to obtain the desired shape and is typically generally planar and continuous while the inner frame member is also stamped, but generally has a three-dimensional shape formed into it by the stamping process to provide strength to the assembled hood while also allowing for cut-out portions in the inner frame member to reduce the overall weight of the hood. The two members are affixed to one another in a variety of manners, but most commonly by "hemming" wherein the edges of at least one of the members are folded over the other of the two members.

Hinges, to permit opening and closing of the hood, are connected to the inner frame member and to the vehicle body and one piece of a two piece latch is connected to the inner frame member and the other piece to the vehicle body, to retain the hood in the closed position on the vehicle unless the latch is released. For safety purposes, an independent secondary latch which engages a recess on the vehicle body is also typically provided on the inner frame member to prevent unintended opening of the hood.

The torsional rigidity and/or stiffness of the vehicle body can be improved by employing a hood as a stressed member in order to the vehicle body, especially at the engine compartment.

Figure 1:
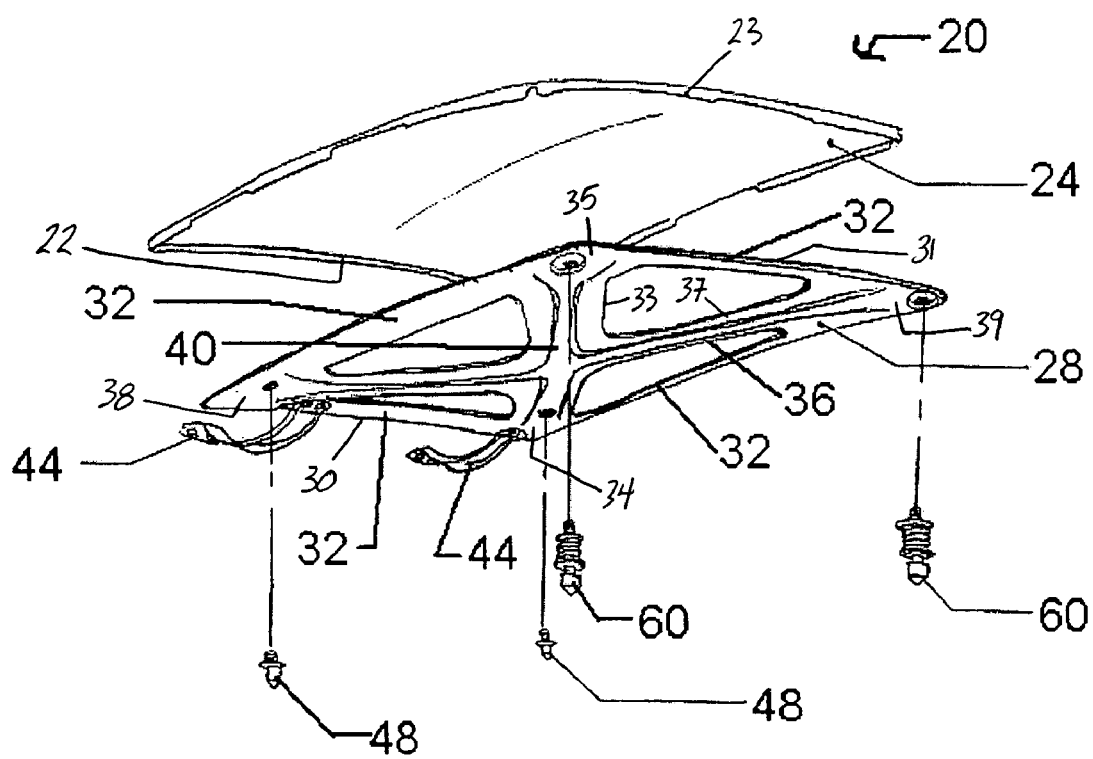
FIG. 1 shows an exploded view of a vehicle hood in accordance with the present invention.

A hood in accordance with the present invention is indicated generally at 20 in FIG. 1. The hood 20 extends between a first or back end 22 and a second or front end 23. Hood 20 is formed from an outer sheet metal layer 24 which can be stamped into a desired shape in a conventional manner and an inner stiffener member 28, seen in isolation in FIG. 2, which can also be stamped into the required shape in a conventional manner.

Figure 2:
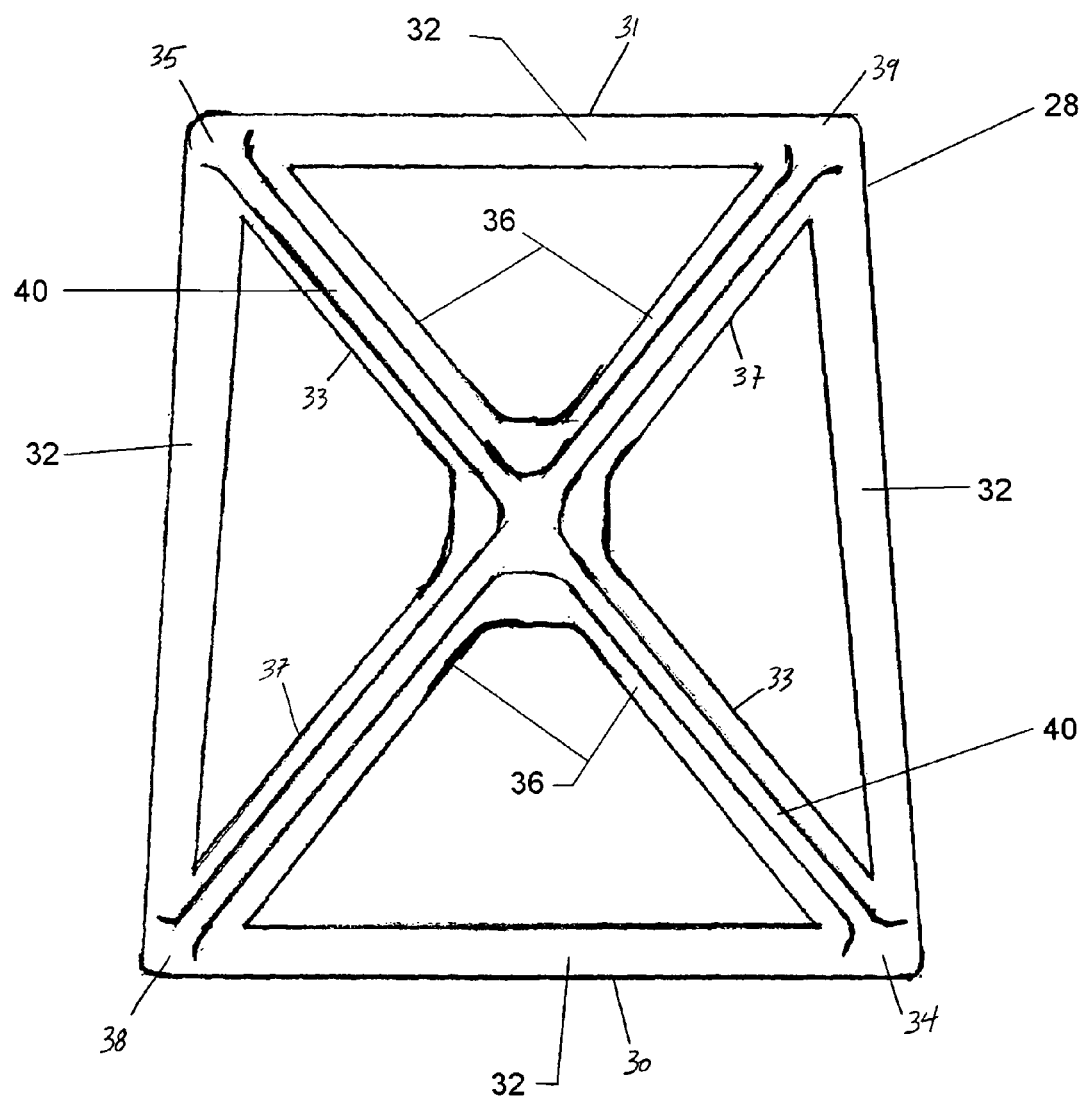
FIG. 2 shows a stiffener member used in the hood of FIG. 1.

As best seen in FIG. 2, inner stiffener member 28 includes a perimeter flange 32 about its periphery to allow stiffener member 28 to be hemmed to outer sheet metal layer 24. Inner stiffener member 28 further includes a generally cruciform shaped cross brace member 36 which extends between the four corners of flange 32 and which has longitudinal channel 40 pressed into each arm of cross brace member 36 to increase the second moment of inertia of the arms of cross brace member 36 to strengthen the ability of cross brace member 36 to carry compressive forces or tension forces. More specifically, the stiffener member 28 extends between a first or rearward end 30 and a second or forward end 31. In the embodiment shown, the cross brace member 36 includes a first cross brace arm 33 extending diagonally between a rearward first corner 34 and a forward second corner 35. The cross brace member 36 also includes a second cross brace arm 37 extending diagonally between a rearward second corner 38 and a forward first corner 39. The first 33 and second 37 cross brace arms intersect generally at their midpoints.

As shown in FIG. 1, a pair of hinge arms 44 are attached to flange 32 at the rear of stiffener member 28 to allow hood 20 to be pivotally mounted to a vehicle in a conventional manner. However, in addition to hinge arms 44, a pair of locating pins 48 are also mounted to stiffener member 28, each locating pin 48 being adjacent to the location that each arm of cross brace member 36 terminates at flange 32, which is generally near the corners of the outer sheet metal layer 24.

Figure 3:
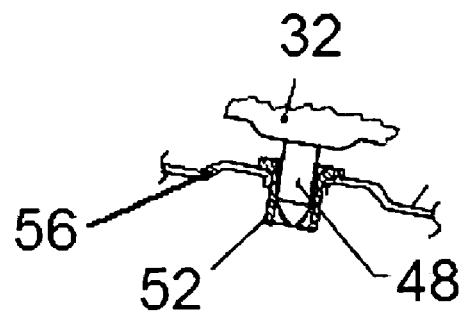
FIG. 3 shows a side section of a locating pin employed with the hood of FIG. 1.

As best seen in FIG. 3, a complementary locating pin receptacle 52 is provided in the vehicle body 56 to receive each locating pin 48 when hood 20 is in the closed position.

As will be apparent, when pins 48 are in receptacles 52, lateral forces from vehicle body 56 are effectively transferred by pins 48 to hood 20 and, in particular, to inner stiffener member 28.

Figure 4A:
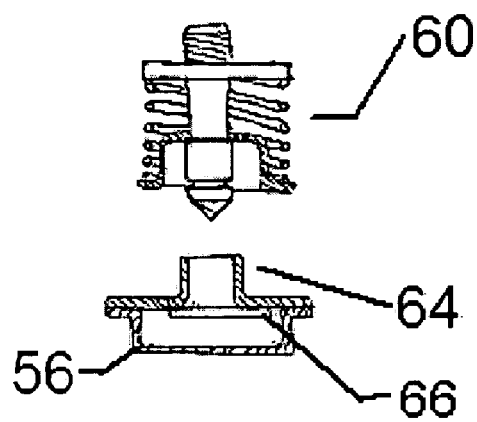
FIGS. 4a and 4b show a side section view of a latch employed with the hood of FIG. 1.
Figure 4B:
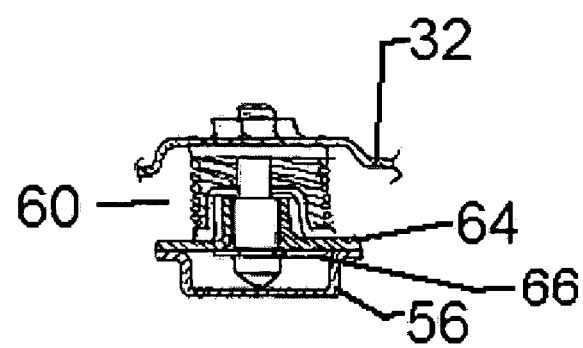

A pair of latch pins 60, best seen in FIGS. 1, 4a and 4b are mounted to the flange 32 at the front edge of stiffener member 28, again adjacent the location that each arm of cross brace member 36 terminates at flange 32. Latch pins 60 are received in complementary latch receptacles 64 mounted to vehicle body 56. As will be apparent, when the latch pins 60 are in latch receptacles 64, lateral forces from vehicle body 56 are effectively transferred by pins 60 to hood 20.

The latches comprised of latch pins 60 and latch receptacles 64 can be similar to those shown in FIGS. 2 and 3 of U.S. Pat. No. 6,394,211 to Palenchar et al. or any other suitable latch, as will occur to those of skill in the art, which can operate to transfer lateral forces between vehicle body 56 and hood 20 and to latch hood 20 into a closed position on vehicle body 56. A latch lock lever 66, in each latch receptacle 64 operates to engage the corresponding latch pin 60 in a conventional manner to maintain the hood 20 in the closed position.

Figure 5:
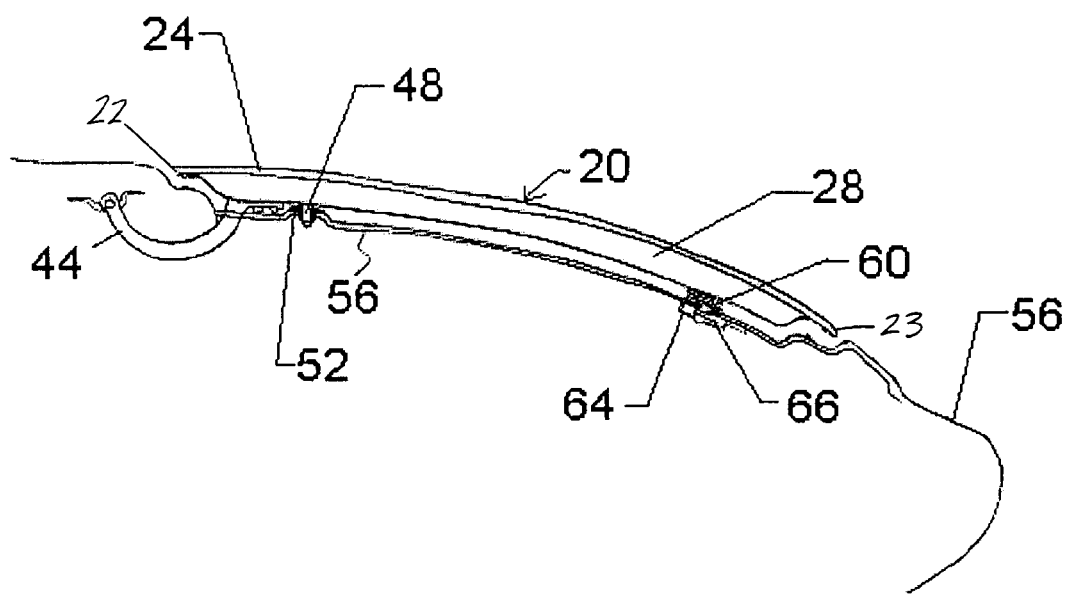
FIG. 5 shows a partially cut away side view of the vehicle hood of FIG. 1 on a vehicle.

FIG. 5 shows hood 20 latched closed on a vehicle body 56. As shown, torsional, tension and/or compressive forces from vehicle body 56 are transmitted to hood 20 through locating pins 48 and latch pins 60 which act as structural connectors between hood 20 and vehicle body 56. Hood 20 carries these forces, via inner stiffener member 28 and, to some extent, outer sheet metal layer 24 and thus mitigates flex of vehicle body 56, by effectively providing a sixth structural side to the engine compartment box. Yet, by releasing latch lock levers 66 in latch receptacles 64 in a conventional manner, such as via a cable mechanism, hood 20 can be opened about hinge arms 44 to provide access to the engine compartment of the vehicle.

Suitable structural connectors for the present invention are not limited to the strike pins and locating pins disclosed herein and any suitable mechanism, as will occur to those of skill in the art, for transferring forces from vehicle body 56 to inner stiffener member 28 can be employed. For example, conventional hinge arms 44 can be replaced with hinge arms designed to be able to transfer the torsional, tension and compressive loads between vehicle body 56 and inner stiffener member 28. Further, while four structural connectors are discussed above, additional structural connectors can be provided if desired.

The present invention provides advantages over the prior art in that the stiffness of the vehicle body is improved at the engine compartment and front end without reducing access to the engine compartment. Manufacture and assembly costs are not necessarily increased and, with hood 20 acting as a stiffener member for vehicle body 56, the front end structure of vehicle body 56 can be redesigned to save materials and/or assembly time which were previously required to increase the body stiffness at the engine compartment. Further, the aesthetics of vehicle body 56 need not be impacted by the increased strength of vehicle body 56 at the engine compartment as the outer sheet metal layer 24 of hood 20 can be virtually identical to a conventional hood.

As should now be apparent to those of skill in the art, the present invention can also be employed with other deck lids, e.g., the trunk lid, in order to strengthen the vehicle body adjacent the cargo holding area. In such a case, a trunk lid can be constructed with an inner strengthening frame in accordance with the present invention and a pair of locating pins and pin latches can be employed to make the trunk lid a structural body member when it is in the closed position.

While the discussion above refers to the outer member of the hood being a sheet metal layer, the present invention is not so limited and the outer member of the stiffener of the present invention can be formed of more than one layer of metal or from glass fiber reinforced plastic or other materials.

In an alternative embodiment of the invention the latch pins 60 may be replaced by another set of locating/force transferring pins engaging correspondingly located receptacles formed in the vehicle body. In this embodiment, a conventional hood latch, not shown, may be located in the front central portion of the hood and vehicle body as is conventional. Also while four locating pins are preferably situated near the corners of the hood, it will be understood that additional force-transferring pins may located at additional positions in order to increase torsional rigidity. Moreover, while the preferred embodiment has a employed a cruciform-shaped cross member, other shapes of cross-members may be employed with the locating/force transferring pins situated at opposing ends of one or more arms thereof in order to transfer forces between the sides of the vehicle body. It will also be understood that the force transferring pins and receptacles collectively form a joint which may employ other types of male and female interconnecting parts, following which it will be appreciated that the male member of the joint can be located on the vehicle body and the female part of the joint can be located on the hood or cross-brace member.

The above-described embodiments of the invention are intended to be examples of the present invention and alterations and modifications may be effected thereto, by those of skill in the art, without departing from the spirit of the invention.

I claim:

1. A motor vehicle, comprising:
    a vehicle body, including an engine compartment;
    a hood extending between a first end pivotally attached to the vehicle body by a pair of pivotal connections and an opposing second end, the hood moveable between an open position to provide access to the engine compartment and a closed position wherein the vehicle can be operated;
    at least a pair of first structural connectors located at the first end of the hood adjacent the pair of pivotal connections, the pair of first structural connectors operatively engaging complementary first receptacles on the vehicle body when the hood is in the closed position; and
    at least a pair of second structural connectors located at the second end of the hood, the pair of second structural connectors operatively engaging complementary second receptacles on the vehicle body to maintain the hood in the closed position until the second receptacles are released;
    wherein the pairs of first and second structural connectors transfer compressive and/or tension forces from the vehicle body to the hood to stiffen the vehicle body by employing the hood as a stressed member when the hood is in the closed position.

2. A motor vehicle as claimed in claim 1 wherein the hood is an assembly of an outer member and an inner stiffener member joined to the outer member, the pairs of first and second structural connectors being connected to the inner stiffener member.

3. A motor vehicle according to claim 2 wherein the outer member is an outer metal sheet layer.

4. A motor vehicle according to claim 3 wherein the inner stiffener member includes a perimeter frame having opposing first and second ends disposed along the respective first and second ends of the hood and a pair of cross brace arms extending between diagonally opposing corners of the perimeter frame in a generally cruciform manner.

5. A motor vehicle according to claim 1 wherein the pair of first structural connectors are locating pins.

6. A motor vehicle according to claim 1 wherein the pair of second structural connectors are latch pins.

7. A motor vehicle according to claim 1 wherein the pair of pivotal connections are hinge arms.

8. A motor vehicle, comprising:
a vehicle body, including an engine compartment having front, rear and two side sections;
a hood extending between a first end and an opposing second end;
an inner stiffener member fixedly secured to the hood, the inner stiffener member including a perimeter frame having opposing first and second ends disposed along the respective first and second ends of the hood and a pair of cross brace arms extending between diagonally opposing corners of the perimeter frame in a generally cruciform manner;
a pair of pivotal connections connected between the first end of the inner stiffener member and the vehicle body allowing the hood to move between an open position to provide access to the engine compartment and a closed position;
a pair of first structural connectors connected to the first end of the inner stiffener member adjacent the pair of pivotal connections, the pair of first structural connectors operatively engaging complementary first receptacles on the vehicle body when the hood is in the closed position; and
a pair of second structural connectors connected to the second end of the inner stiffener member, the pair of second structural connectors operatively engaging complementary second receptacles on the vehicle body to maintain the hood in the closed position until the second receptacles are released;
the pairs of first and second structural connectors acting between the inner stiffener member and the vehicle body when the hood is in the closed position in order to transfer tension, compression and torsion forces via the inner stiffener member between the front, rear, and side sections.

9. A vehicle body stiffener for a vehicle body, the vehicle body stiffener comprising:
an outer sheet member;
an inner stiffener member fixedly secured to the outer sheet member, the inner stiffener member including a perimeter frame having opposing first and second ends and a pair of cross brace arms extending between diagonally opposing corners of the perimeter frame in a generally cruciform manner;
a pair of hinges connected between the first end of the inner stiffener member and the vehicle body allowing the vehicle body stiffener to move between an open position and a closed position;
a pair of locating pins connected to the first end of the inner stiffener member adjacent the respective pair of hinges, the pair of locating pins operatively engaging complementary locating pin receptacles on the vehicle body when the vehicle body stiffener is in the closed position; and
a pair of latch pins connected to the second end of the inner stiffener member, the pair of latch pins operatively engaging complementary latch receptacles on the vehicle body to maintain the vehicle body stiffener in the closed position until the latch receptacles are released;
wherein the latch pins, locating pins, and hinges transfer compressive and/or tension forces from the vehicle body to the inner stiffener member to stiffen the vehicle body when the vehicle body stiffener is in the closed position.

10. A vehicle body stiffener according to claim 9 wherein the outer sheet member and inner stiffener member form an engine compartment hood.

11. A vehicle body stiffener according to claim 9 wherein the outer sheet member and inner stiffener member form a cargo area closure.

12. A vehicle body stiffener according to claim 9 wherein the outer sheet member and the inner stiffener member are formed by stamping and are attached to each other by hemming.

13. A vehicle body for an automotive vehicle including an engine compartment, the vehicle body including a closure for the engine compartment comprising:
an outer sheet member;
an inner stiffener member fixedly secured to the outer sheet member, the inner stiffener member including a perimeter frame having opposing first and second ends, said inner stiffener member further including first and second cross brace arms extending diagonally between rearward and forward first and second corners at the respective first and second ends of the inner stiffener member in a generally cruciform manner;
a pair of hinges connected between the first end of the inner stiffener member and the vehicle body allowing the closure to move between opened an open position and a closed position, the pair of hinges disposed between the rearward first and second corners;
a pair of locating pins connected to the rearward first and second corners of the inner stiffener member adjacent the respective pair of hinges, the pair of locating pins operatively engaging complementary locating pin receptacles on the vehicle body when the closure is in the closed position; and
a pair of latch pins connected to the forward first and second corners of the inner stiffener member, the pair of latch pins operatively engaging complementary latch receptacles on the vehicle body to maintain the closure in the closed position until the latch receptacles are released;
wherein the latch pins, locating pins, and hinges transfer compressive and/or tension forces from the vehicle body to the inner stiffener member to stiffen the vehicle body when the closure is in the closed position.

14. A motor vehicle according to claim 4 wherein each of the pair of cross brace arms includes a longitudinal channel formed therein to strengthen the pair of cross brace arms.

15. A motor vehicle according to claim 8 wherein the pair of first structural connectors are locating pins.

16. A motor vehicle according to claim 8 wherein the pair of second structural connectors are latch pins.

17. A motor vehicle according to claim 8 wherein the pair of pivotal connections are hinge arms.

18. A motor vehicle according to claim 8 wherein each of the pair of cross brace arms includes a longitudinal channel formed therein to strengthen the pair of cross brace arms.

19. A vehicle body stiffener according to claim 9 wherein each of the pair of cross brace arms includes a longitudinal channel formed therein to strengthen the pair of cross brace arms.

* * * * *